United States Patent [19]

Flory

[11] 4,410,981

[45] Oct. 18, 1983

[54] SIMPLIFIED TRANSMISSION SYSTEM FOR SEQUENTIAL TIME-COMPRESSION OF TWO SIGNALS

[75] Inventor: Robert E. Flory, Princeton, N.J.

[73] Assignee: RCA Corporation, New York, N.Y.

[21] Appl. No.: 292,574

[22] Filed: Aug. 13, 1981

[30] Foreign Application Priority Data

Jan. 28, 1981 [GB] United Kingdom ............... 8102595

[51] Int. Cl.³ .............................................. H04B 1/66
[52] U.S. Cl. ................................... 370/109; 358/334; 381/34
[58] Field of Search .................. 370/109, 91; 358/334; 179/15.55 T

[56] References Cited

U.S. PATENT DOCUMENTS

| | | | |
|---|---|---|---|
| 3,636,524 | 1/1972 | Holland | 370/109 |
| 3,673,335 | 6/1972 | Joel | 370/109 |
| 4,300,161 | 11/1981 | Haskell | 370/109 |
| 4,316,061 | 2/1982 | Ahamed | 370/109 |

FOREIGN PATENT DOCUMENTS

1215555 of 0000 United Kingdom .

*Primary Examiner*—Douglas W. Olms
*Attorney, Agent, or Firm*—E. M. Whitacre; W. H. Meise

[57] ABSTRACT

Two signals are generated simultaneously. In order to pass them through a single signal channel, the two signals are time-compressed and rearranged into a time-sequential form by means of pairs of controllable delay lines. The delay lines are controlled from a single drive circuit so that the delay of both is long when clocking is at a low rate. In the long-delay mode, the two delay lines are coupled to the two signal sources to be loaded with signal in parallel. The mode of both delay lines is then switched to a short-delay mode. In order to achieve sequential operation, the mode switching is accompanied by a coupling of the signal output terminal of one of the delay lines to the signal input of the other. In the second mode, the first delay lines clocks out to a system output terminal, while the other clocks to the output terminal through the first, thereby achieving a sequential output signal.

2 Claims, 5 Drawing Figures

SIMPLIFIED TRANSMISSION SYSTEM FOR SEQUENTIAL TIME-COMPRESSION OF TWO SIGNALS

BACKGROUND OF THE INVENTION

This invention relates to a simplified transmission system for color television signals having improved signal-to-noise (SN). In magnetic recording of television signals by video tape recorders, the record or playback head may occasionally fail to come into contact with the magnetic oxide coating because of variations in tape tension, build-up of dirt on the heads and the like. This may cause a reduction in the amplitude of the signal transduced from the tape to the playback head, and may result in objectionable distortion. It is known to frequency-modulate a carrier with the video information to be recorded. Such frequency modulation of the signal translates amplitude changes of the video signal into frequency changes of the carrier. An amplitude limiter coupled to receive the frequency-modulated signal strips away amplitude variations resulting from imperfect head contact, and the frequency-modulated signal when demodulated has an improved signal-to-noise compared with the case of direct recording.

When color television signals encoded in a standard NTSC manner including luminance components and chrominance components quadrature-modulated onto a color subcarrier are recorded, the total frequency bandwidth of the video signal is large. When it is desired to record such an NTSC signal, it is found that the total bandwidth of the NTSC signal is so large that the sidebands of the frequency-modulated carrier extend over a greater frequency band than can be encompassed within the FM channel of the recorder. Consequently, the "color under" system has been used in the past. In this system, the color subcarrier, quadrature modulated with chroma components, is directly recorded at a low frequency on the same tape track with an FM carrier modulated by video luminance information. To improve linearity, the directly recorded chrominance information is recorded with the aid of a bias signal. To prevent interaction between the bias signal and the frequency-modulated carrier, the FM carrier is often used as the bias signal. While such an arrangement allows recording of a color television signal on a single track of a video tape recorder, certain problems exist, such as poor SN of the chrominance signal, crosstalk between the two quadrature-modulated color signals, and limited frequency bandwidth which necessitates reduction of the desired bandwidth in either the chrominance or luminance information, or possibly both. Furthermore, the FM luminance carrier cannot be modulated to the maximum possible amount because maximum modulation drives the recording medium into saturation, adding distortion to the directly recorded chrominance information.

In order to improve the quality of the television signal to broadcast standards, the luminance information may be recorded on a first track of the tape by the use of a frequency-modulated carrier, while at the same time recording the quadrature-modulated chrominance information onto a second track of the tape adjacent the first. The chrominance information is modulated onto a frequency-modulated carrier for improved signal-to-noise. It has been found, however, that broadcast quality may not be achieved even in such a system using two wideband channels for the recording of the video information. Furthermore, it has been found that cross-modulation occurs between the two components of the chrominance signal.

In order to obtain improved characteristics for a two-channel tape recorder or other transmission system, it is desirable to reduce the frequency of the signal modulating the chrominance channel. Each of the baseband color-difference signals alone has a lesser bandwidth than does the quadrature-modulated signal. The frequency bandwidth of the signal modulating the chrominance channel may be reduced by alternately modulating the frequency-modulated carrier in the chrominance signal channel with one of the two chrominance signals representing the chrominance information. For example, if the chrominance information is represented by I and Q signals, where the I signal has a frequency bandwidth of 1 MHz and the Q signal has a frequency bandwidth of 0.5 MHz, each of these signals is alternately modulated onto the carrier for coupling into the channel. Alternation, however, results in a loss of I signals during that interval in which Q signals are being carried through the system, and similarly Q signals are lost during that interval in which I signals are being processed. Thus, there is a loss in signals similar to that which occurs in a SECAM system. In the SECAM system, the line-to-line alternation of the chrominance information results in a reduced vertical chrominance resolution which degrades the picture. U.S. patent application Ser. No. 124,107 filed Feb. 25, 1980 in the name of Dischert et al describes a two-channel system in which baseband luminance is transmitted in real time while baseband chrominance is time-compressed by delay lines. Each baseband chrominance signal for transmission is clocked into a delay line at a low clock rate and is clocked out at a higher rate, thereby creating the time compression. (At the receiving end, a complementary operation takes place). Ordinarily, there are two baseband color-difference signals to be processed. Since they are time-division multiplexed onto the single chrominance channel, they must pass through the channel sequentially. Consequently, the aforementioned Dischert et al system used four delay lines and a system of switches for coupling signals to and from the delay lines and also for coupling high and low clock signals to the delay lines for controlling the writing-in and reading-out rates.

It is necessary to use two delay lines per channel to accomplish the desired compression because the write-in and read-out rates are different, yet the CCD delay lines ordinarily used will write in while operated at the clock-out rate and will read out while operated at the write-in rate.

The CCD delay line is ordinarily an integrated circuit which is made by processing techniques which form an entire delay portion and its associated controlled clocking drive and internal control circuits simultaneously in a batch process. It has been found by at least one manufacturer (Fairchild) that it is advantageous to form two independent delay portions and one controlled clock drive and internal control system in each IC. Thus, each IC contains one control circuit and two independent delay lines. Since each of the two delay lines in the IC are controlled from the same control circuit, they are clocked in parallel and operate at the same time.

It is desirable to reduce the cost of a time-compressed signal processing system by making use of the two delay lines in each IC which are controlled in parallel.

SUMMARY OF THE INVENTION

A signal processor for transforming between relatively time-expanded first and second signals occurring simultaneously and the same signals in time-compressed form occurring sequentially includes first and second controllable delays, the first terminals of which are coupled by a switch to terminals on the time-expanded side during a first or parallel operating mode. The switch couples the delays to a third terminal on the time-compressed side of the processor in the second or sequential mode. A delay controller which in the case of CCD delay lines may be a clock controls each delay to be long in the first mode and shorter in the second mode of operation.

The delay controller controls both delays simultaneously, and the switch couples a second terminal of one of the delays to the first terminal of the other in the second or sequential operating mode by means of which sequential signals at the second terminal of the first delay are coupled with the second delay line by way of the first delay line.

DESCRIPTION OF THE INVENTION

Figure 1:
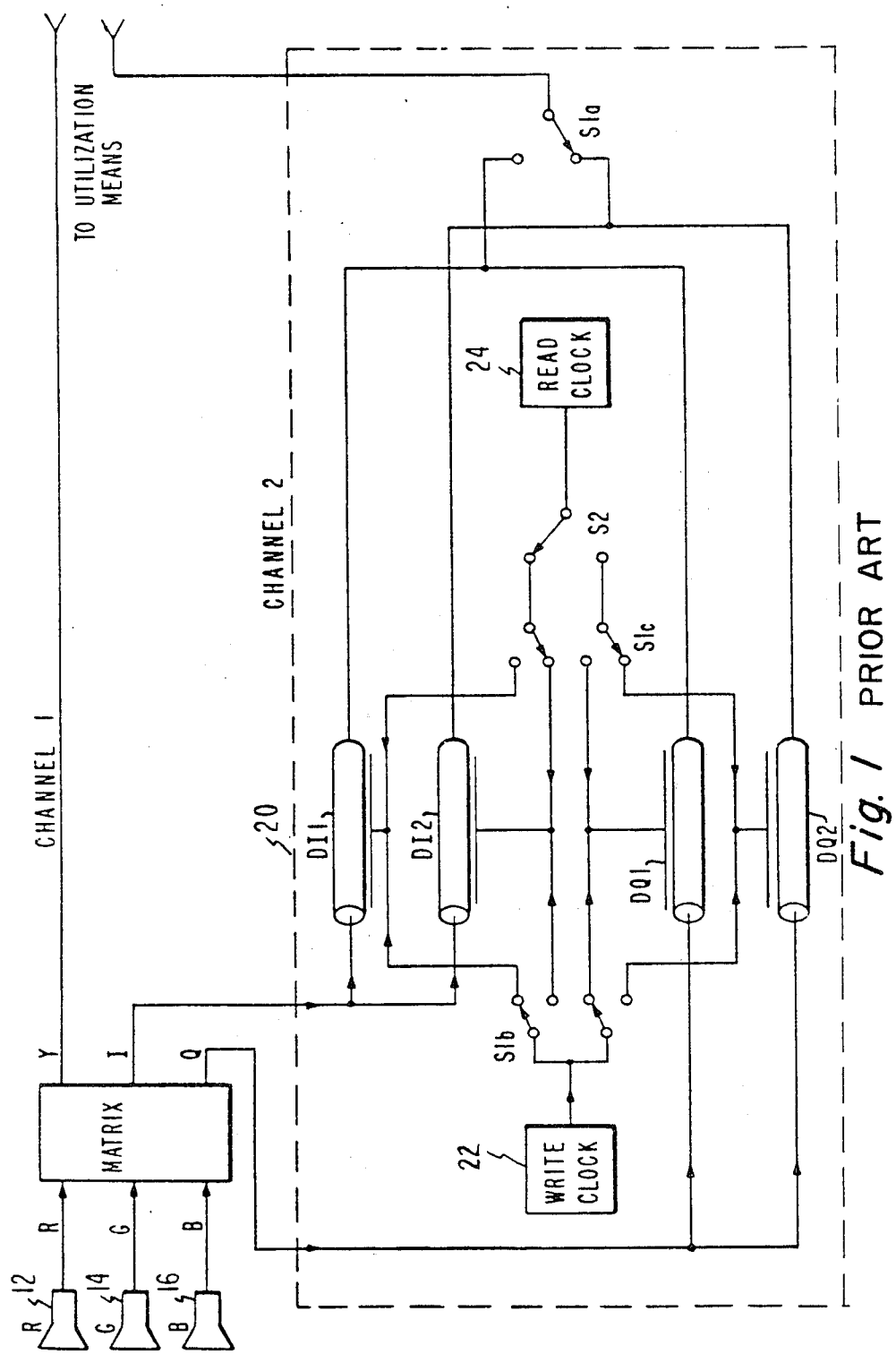
FIG. 1 shows an operating state of a transmission system including a signal processor according to the prior art.

FIG. 1 illustrates a generalized transmission system to which color television signals are applied. In this instance, the television signals are generated by a matrix 10 which receives red (R), green (G) and blue (B) baseband video signals from individual video cameras 12, 14 and 16, respectively. Matrix 10 processes this plurality of baseband components defining luminance and chrominance information to produce luminance (Y) information which is coupled directly by a first channel of the transmission system to a utilizing means (not shown). Matrix 10 also forms further baseband components conventionally known as I and Q signals representative of the chrominance information being processed, and couples them to a signal processor 20 of a second channel of the transmission system. The I signals are coupled in parallel to the inputs of clocked delay lines DI1 and DI2 of processor 20 for further processing, and the Q signals are coupled in parallel to the inputs of further clocked delay lines DQ1 and DQ2. (Delay lines are designated generally by the letter D, those processing I information are also designated by the letter I, those processing Q information by the letter Q.) The outputs of delay lines DI1 and DQ1 are coupled in parallel, and the outputs of delay lines DI2 and DQ2 are coupled in parallel. A single-pole, double-throw switch S1A switches alternately between the parallel outputs of the delay lines for selecting the output signal of processing portion 20 of the transmission channel. The remainder of processing portion 20 of the second transmission channel is a clocking arrangement by which sequential processing of the I and Q signals in the delay lines is accomplished without loss of information and the consequent loss of resolution.

A write clock generator 22 is coupled by a double-pole, double-throw switch S1B to pairs of delay lines DI, DQ for clocking the delay lines to cause signals to be coupled therethrough. For example, at the time illustrated in FIG. 1, switch S1B couples the write clock signal to DI1 and to DQ1. A read clock generator 24 is also coupled to delay lines DI, DQ by way of a double-pole double-throw switch S1C and a single-pole double-throw switch S2. A switch drive means (not shown) drives switches S1A, S1B, and S1C synchronously at the horizontal rate and drives switch S2 at twice the horizontal rate. Switch S1 toggles at a time during the horizontal blanking interval and switch S2 toggles synchronously with switch S1 and also at a time near the center of each horizontal line interval.

Clocked delay lines D in the embodiment of FIG. 1 may include charge-transfer devices of the type known as charge-coupled devices (CCD) which are well known in the art. Each CCD consists of a number of cells which when clocked cause a sequential transfer from cell to cell of charge packets representing analog signals. Thus, each delay line may be considered a sampled analog delay line, the sample rate of which is determined by the clock rate and the delay of which is determined by the clock rate of the number of cells. The clocking rate of generator 22 is selected based upon the maximum frequency which may be expected in the signals being processed through the delay lines so as to provide a faithful reproduction of the signal as determined by Nyquist's criterion. For example, the minimum frequency of write clock generator 22 might be selected to be twice the maximum frequency expected to be processed through a delay line. The number of cells in each delay line D is selected to have a propagation delay of 1H, which is sufficient delay to store an I or Q signal occurring during one horizontal line. Read clock generator 24, in a particular embodiment of the invention, has its frequency selected so as to allow signal to propagate through a delay line at twice the writing rate, thereby allowing the signal representing an entire horizontal line of chrominance information to be read out of a delay line during an interval equal to one-half of a horizontal line.

Figure 2:
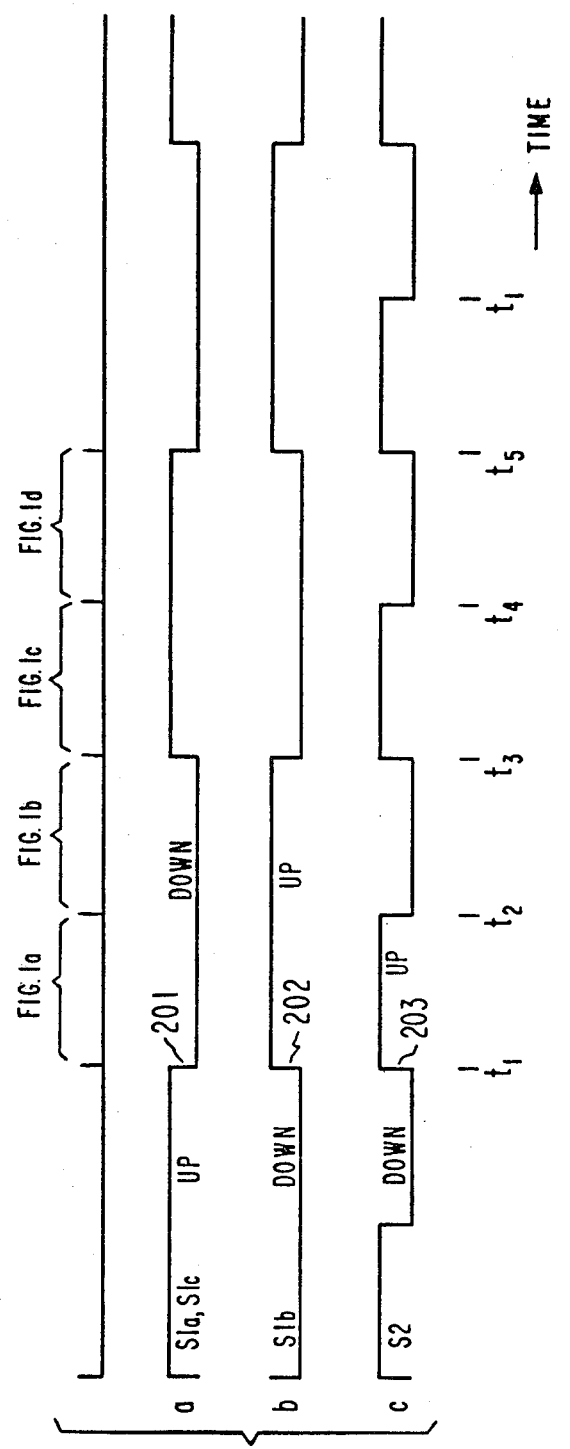
FIG. 2 illustrates a state diagram useful in understanding the operating cycle of the arrangement of FIG. 1.

Prior to time T1, as illustrated in FIG. 2, DI2 and DQ2 were clocked at the write rate so as to store the entire I and Q signals, respectively, for the preceding horizontal line. Delay lines DI1 and DQ2 contain material unsuitable for transmission. At time T1, which may occur during a horizontal blanking interval or during a transition from one line to the next, the condition of switches S1 and S2 changes as shown by waveforms 201, 202 and 203 of FIGS. 2a, 2b and 2c, respectively. A high condition of any of waveforms 201–203 represents an "up" condition of the switch associated with that waveform. Thus, in the interval between time T1 and T2 of FIG. 2, switches S1A and S1C are in a "down" position as represented by a low condition of waveform 201; switch S1B is in an "up" position as represented by a high condition of waveform 202; and switch 2 is in an "up" position as represented by waveform 203. Thus, the condition of the switches of FIG. 1 in the interval T1-T2 is that condition represented in FIG. 1. The condition of the switches repeats cyclically.

In the interval preceding time T1, as mentioned, DI2 and DQ2 were clocked by write clock generator 22 so as to store in DI2 and DQ2 a sampled analog version of the I and Q signals occurring in the preceding line. DI1 and DQ1 contain unsuitable information. At time T1, the switch configuration becomes that of FIG. 1, as indicated by FIG. 2. Write clock generator 22 becomes coupled at time T1 to DI1 and DQ1, which begin clocking at the writing rate to progressively store the I and Q signals occurring in the interval T1-T2. The unsuitable material stored therein is simultaneously clocked out, but the unsuitable material is decoupled from the output of transmission processor 20 at switch S1A and does not affect the output signal. Delay line DQ2 remains in a passive storage mode in interval T1-T2. Also in the interval T1-T2, read clock generator 24 is coupled to delay line DI2, and the I signal stored therein is clocked out at twice the rate at which it was clocked in. The signal clocked out of DI2 is coupled by switch S1A to the output of transmission processor 20. While DI2 is clocking out, the I signal at its input is also clocked into cells of delay line DI2. However, the current line I information is not coupled to the output of processor 20 because at the moment that the first of the current line information would begin to exit from DI2, switch drive signal 203 takes a transition representing the switching of S2 to produce a configuration during interval T2-T3 in which write clock generator 22 continues to be coupled to DI1 and DQ1 for loading or storing the current line I and Q information. However, no clocking signals at all are coupled to DI2, and it becomes passive and retains the stored I information from the first half T1-T2 of the first horizontal line T1-T3. Switch S1C coupled read clock 24 to previously passive DQ2. DQ2 contains the Q information from the horizontal line preceding time T1. Beginning at time T2, this I signal is clocked to the output of transmission processor 20. As in the case of DI2, the clocking out of the stored information causes the storage in DI2 of Q information from the current line. However, Q information from the current line cannot begin to exit from DQ2 until after time T3. AT time T3, the first horizontal line ends and the second horizontal line begins.

At time T3, the condition of the switches of FIG. 1 changes as indicated by waveforms 21-203, and in the interval T3-T4. DI2 and DQ2 are coupled to the write clock and their parallel outputs are decoupled from the output of processor 20. Consequently, DI2 begins to store currently generated I signal and DQ2 begins to store currently generated Q signal. The unusable half-line information stored therein during the previous line is clocked out as current signal is stored. During the interval T3-T4, DQ1 is not clocked and merely retains the stored Q information from horizontal line T1-T3. DI2, however, is coupled to read clock generator 24, and begins to read out the I information stored during line T1-T3 in a manner similar to that already described. At time T4, when all of the I information relating to horizontal line T1-T3 has been read out, but before I information stored subsequent to time T3 has been read out, the switch configuration again changes to that represented by waveforms 201-203 of FIG. 2 in the interval T4-T5. This configuration in the interval T4-T5 allows loading in DI2 and DQ2 of the I and Q signals then being generated, and allows DQ1 to be read so as to couple to the output of processor 20 of the Q signal stored during interval T1-T3 of the preceding horizontal line. AT time T5, then DI2 and DQ2 are loaded with information which is not useful for transmission and DI1 and DQ1 are loaded with the I and Q, respectively, information from the preceding line. This will be recognized as the same condition as that which preceded time T1, and that the cycle as described can repeat.

Thus, the arrangement of FIG. 1 represents a two-channel transmission system in which the luminance information is transmitted on one channel and the chrominance information is represented by baseband I and Q signals which are generated concurrently, stored and then time compressed for sequential coupling to the second channel of the transmission system.

Figure 3:
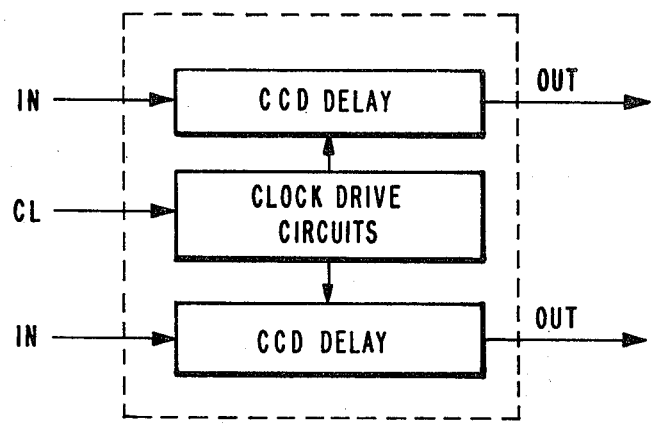
FIG. 3 illustrates a pair of CCD delay lines controlled by common clock circuits.

Certain CCD delay lines currently available, such as the Fairchild CCD 323 manufactured by Fairchild Camera and Instrument Corporation, the address of which is 4001 Miranda Avenue, Palo Alto, Calif., have the delays formed in pairs on a substrate or chip encapsulated as a microcircuit. The pairs share common clock, as illustrated in FIG. 3, so the drive cannot be independent. It is of course possible to utilize such microcircuits for sequential time-compression encoding by using the clock drive together with one of the CCD delays, thereby allowing one delay in each microcircuit to go unused. This is wasteful, and it is therefore desirable to have an arrangement whereby such microcircuits can be completely utilized.

The Fairchild device has 283 storage elements. Registry of one line of a color component requires a clock drive at a frequency of 283H. To read out with a time compression factor of two, the clock frequency must be increased to 566H. If the clock frequency is alternated between 283H and 566H on a line-by-line basis, then signal can be stored during one line and read out time compressed on the following line. When two independent signals are being stored, two CCD's must be clocked at 283H to load the two delay lines with the signals, so the clocking-in is easy. However, when the clock is switched to 566H to clock out the data in time-compressed form, the two delays in the microcircuit clock out compressed data simultaneously rather than sequentially. In the prior art, the clocking signal applied to the later delay line could be delayed to delay clocking out of the second signal until after completion of clocking-out of the first of the two sequential signals.

Figure 4:
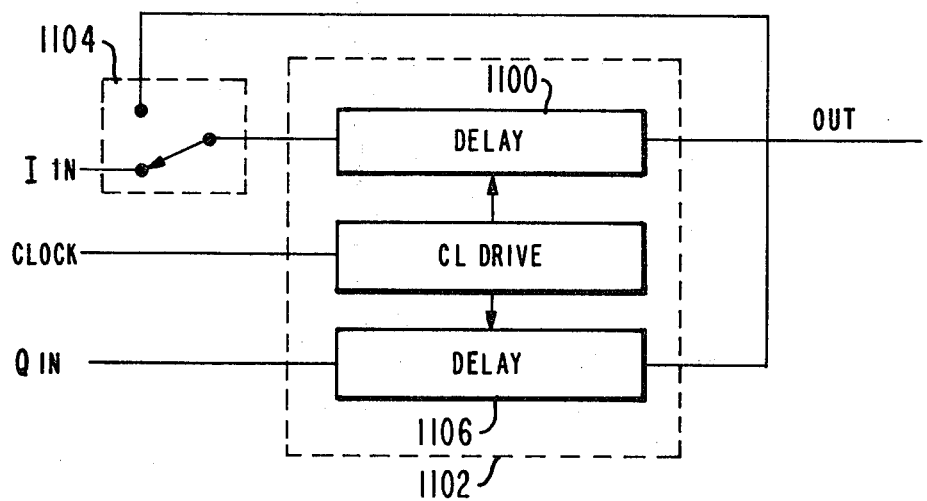
FIG. 4 illustrates an arrangement according to the invention for processing pairs of signals.

FIG. 4 illustrates generally an arrangement according to the invention for sequential time-compressed encoding of independent I and Q signals. Naturally, other signals can be used. In FIG. 4, the input to delay 1100 of microcircuit 1102 is coupled to the source (not shown) of I signals by a switch 1104. The output of delay circuit 1106 is coupled to another contact of switch 1104. With switch 1104 in the position shown, clocking in of I and Q signals at 283H can be accomplished from a clock generator (not shown).

Unloading of the stored signals is accomplished by a two-step operation. The first step is to operate switch 1104 to the alternate position to couple the output of delay circuit 1106 to the input terminal of delay circuit 1100. The second step is to operate the clock at 566H. As delay 1100 clocks out the time-compressed I signal, it propagates the time-compressed Q signal from the output of delay 1106 to the output of delay 1100 by way of delay line 1100 with a delay of H/2. Thus, the time-compressed I output signal is immediately followed by the time-compressed Q output signal, as desired.

Figure 5:
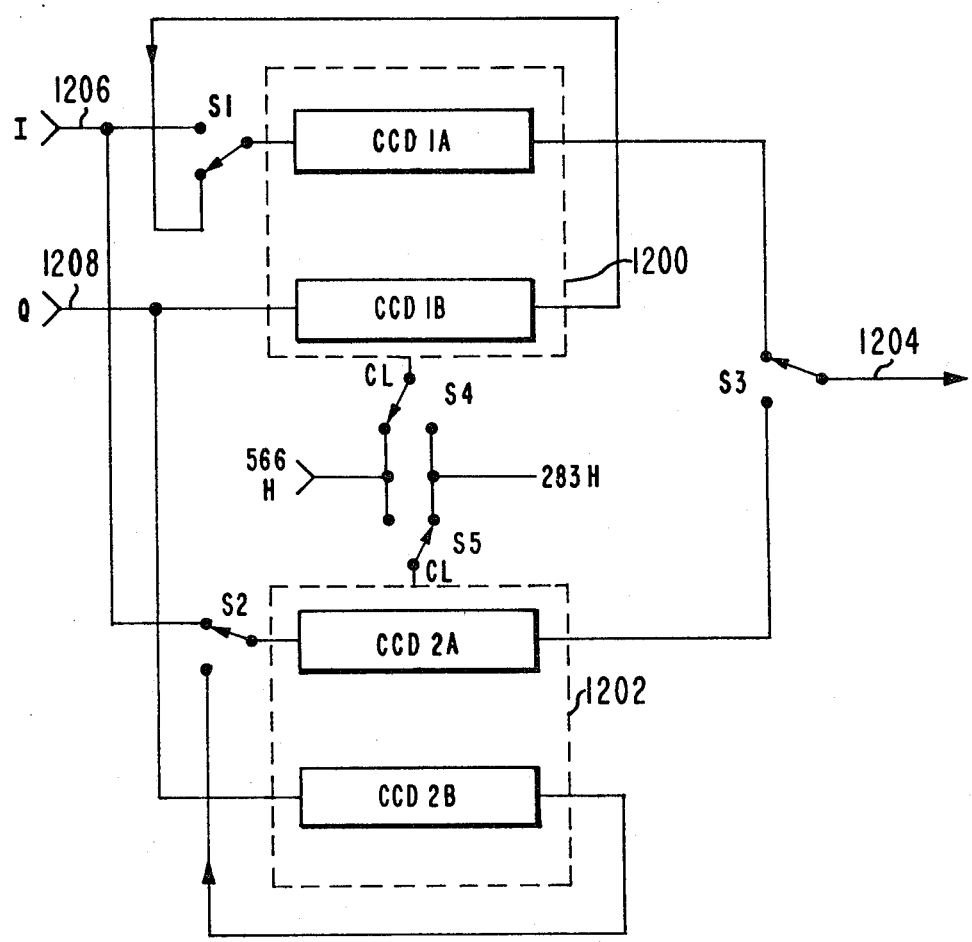
FIG. 5 is another embodiment of the invention for providing continuous processing of signals from a pair of sources.

Since clock-in and clock-out occur on alternate lines for microcircuit 1102, it is necessary to have four delays (two microcircuits) as in FIG. 5 so that the signal continuously being generated by the source coupled to terminals 1206, 1208 always has a delay line into which it can be written. In the absence of a pair of such microcircuits, alternate lines of I and Q would be lost. With the switch positions shown in FIG. 5, I and Q are being clocked into CCD delay 2A and 2B, respectively, at 283H, I is being clocked out of CCD 1A at 566H, and Q is being clocked from CCD 1B through CCD 1A at 566H to appear on output line 1204. At the end of the horizontal line, switches S1-S5 are thrown to their alternate positions, whereupon microcircuit 1200 loads while 1202 unloads.

The arrangement of FIG. 5 can be used for decoding by applying the time-compressed signals to the output line 1204, although the I and Q labels on terminals 1206 and 1208 must then be reversed to represent the actual decoded output signal.

Other embodiments of this invention will be apparent to those skilled in the art. In particular, memories may be used to perform the delays for signals in digital form rather than using CCD delay lines for analog signals, as described.

What is claimed is:

1. A signal processor for transforming between relatively time-expanded simultaneous and time-compressed sequential first and second signals said processor comprising:

first and second processor terminals at which the simultaneously-occurring relatively time-expanded signals appear;

a third processor terminal at which the time-sequential relatively time-compressed signals appear;

first and second signal delay means each having first and second terminals;

switch means for simultaneously coupling a first terminal of each of said first and second delay means to said first and second processor terminals for coupling signals therebetween during a first mode of operation, and for decoupling said first and second delay means from said first and second processor terminals and coupling said third processor terminal with said first and second delay means during a second mode of operation in which said third terminal is coupled with said delay means for transfer of time-sequential signals therebetween;

delay control means coupled to said first and second delay means for controlling the delay, the delay being relatively long in said first mode of operation and relatively short in said second mode of operation, wherein the improvement lies in that said delay control means controls both said first and second delay means to have the same delay; and said switch means couples said second terminal of said second delay means with said first terminal of said first delay means during said second mode of operation whereby said second terminal of said second delay means is coupled with said third processor terminal through said first delay means.

2. A processor for transforming two signals from simultaneous relatively time-expanded form to sequential relatively time-compressed form, the processor comprising:

first and second processor terminals at which said first and second simultaneous signals appear, respectively;

a third processor terminal at which said sequential signals appear;

first and second controllable delay means, each of said delay means including first and second signal terminals;

coupling means for coupling said first and second processor terminals with said first terminals of said first and second delay means, respectively, and for coupling said third processor terminal with said first and second delay means;

delay control means coupled with said first and second delay means for controlling the delay of said first and second delay means in at least a first long-delay mode during coupling of signals between said first and second processor terminals and said first and second signal terminals of said delay means, and in a second short-delay mode during coupling of said third processor terminal with said delay means;

wherein the improvement lies in that said delay control means controls said first and second delay means in parallel whereby the mode of operation of each of said first and second delay means is dependent upon the mode of operation of said delay control means;

and said coupling means further comprises switch means coupled to said first signal terminal of said first delay means, to said second terminal of said second delay means and to said first processor terminal for coupling said first signal terminal of said first delay means with said first processor terminal during said first mode of operation and for coupling said first signal terminal of said first delay means with said second signal terminal of said second delay means during said second mode of operation.

* * * * *